United States Patent Office 3,372,883
Patented Mar. 12, 1968

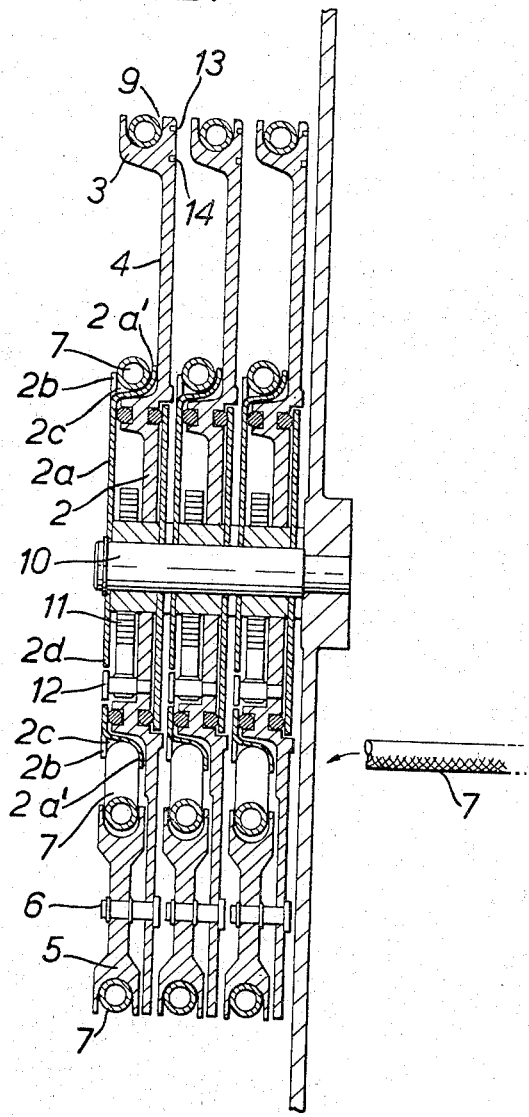

3,372,883
APPARATUS FOR DRAWING IN AND OUT DENTAL HOSES
Sadayasu Ota, 19 Momoyama Tsutsui Igacho, Fushimi-ku, Kyoto, Japan
Filed Aug. 22, 1966, Ser. No. 574,000
Claims priority, application Japan, Dec. 10, 1965, 40/75,961
7 Claims. (Cl. 242—47.5)

ABSTRACT OF THE DISCLOSURE

This disclosure relates to rotatable apparatus for paying out and drawing in dental hoses in dental accessory equipment. The apparatus includes rotatable means mounted on an axis and having a dental hose or the like mounted with a portion thereof extending in contact with the rotatable means. Means associated with the rotatable means and immovable relative thereto supports another portion of the hose in contact therewith. Means are included for biasing the rotatable means to rotate in one direction about the axis so as to move the hose in the same direction in sliding contact with the rotatable means, thereby drawing in the hose.

---

This invention relates to an apparatus for drawing in and out the hoses connected to dental instruments for supply of air, water or the like, and more particularly to a locking mechanism for use in such an apparatus.

A dental instrument such as a syringe has a supply hose which is connected to a source of air, water or the like in a dental unit and adapted to be drawn out therefrom for use and retracted thereinto when not in use. There are many types of mechanisms for drawing the hoses in and out. In one of them, for example, there is provided in the dental unit a pulley with a weight secured thereto which is vertically movable within the unit. A hose has its one end fixed at a position higher than the upper limit of movement of the pulley and weight and extends downwardly to pass around the pulley and goes upwardly near the upper limit of movement of the pulley and finally comes out of the unit. In such an arrangement, however, as the hose is pulled from outside the unit, the pulley and weight are raised inside the unit, thereby allowing the hose to be paid out of the unit. The arrangement has the disadvantage that a relatively large space must be provided inside the unit, enough to enable the vertical displacement of the pulley and weight, with resulting increase in the size of the unit.

It is desirable that a dentist can selectively draw out any desired length of hose just sufficient for him to reach the patient's mouth and manipulate the instrument with ease. If a mechanism is such that only a predetermined length of hose, and not longer or shorter than that, can be drawn out, and if it is too long for the present use, the excess length of the hose certainly obstructs free and efficient performance of the dentist.

Accordingly, it is one object of the invention to provide an apparatus for drawing in and out a hose for use with a dental instrument, which is compact in size.

Another object of the invention is to provide such an apparatus as aforesaid in which any desired length of hose can be drawn out and automatically locked against retraction.

Another object of the invention is to provide such an apparatus as aforesaid in which the hose can be released from the lock for retraction to any desired length.

A further object of the invention is to provide such an apparatus as aforesaid which is capable of accommodating a plurality of hoses without substantially increasing the size of the apparatus.

Other objects, features and advantages of the invention will become apparent from the following detailed description of a preferred embodiment thereof with reference to the accompanying drawings, wherein:

FIG. 2 is a section taken on line 2—2 of FIG. 1;

Figure 4:
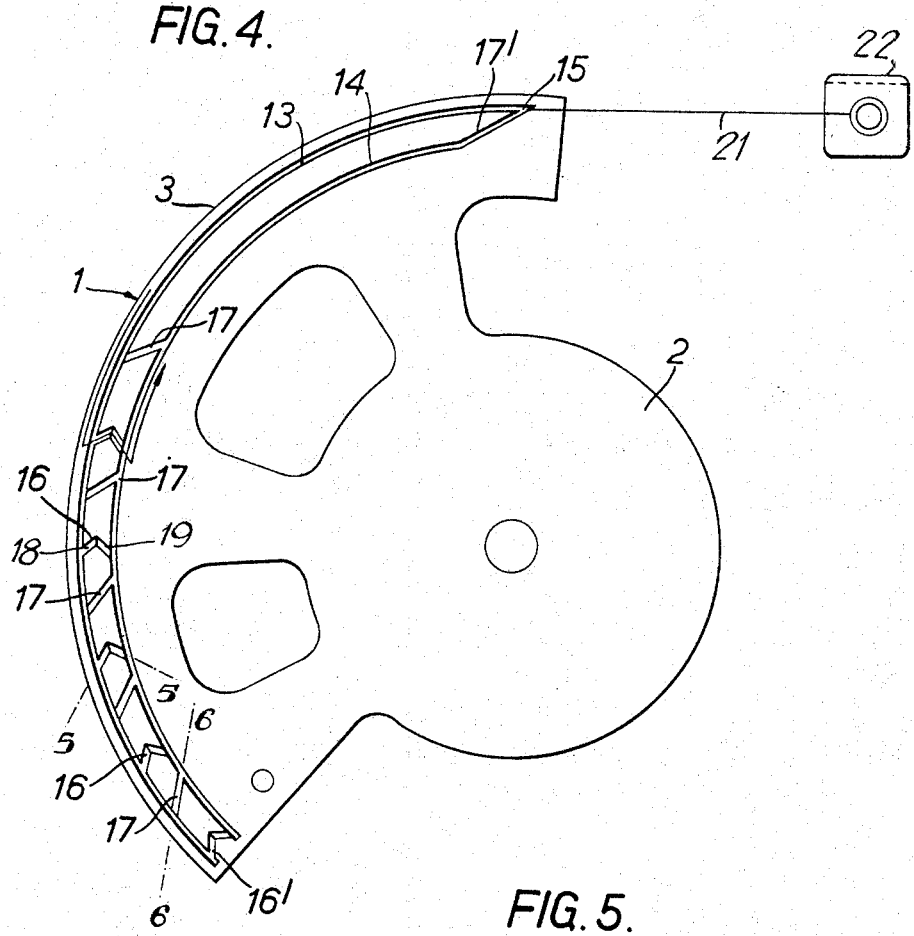
FIG. 4 is a bottom view of the sector plate shown in FIG. 1.
Figure 5:
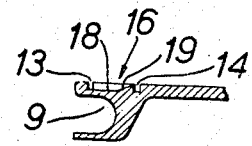
Figure 6:
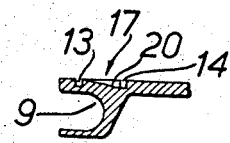

FIGS. 5 and 6 are sections taken on lines 5—5 and 6—6 of FIG. 4, respectively.

Referring now in detail to the drawings, there is shown a generally sector-shaped plate generally designated at 1, which comprises a central disc 2, a peripheral arcuate plate 3 and a plurality of radial ribs 4 connecting the disc 2 and plate 3 into an integral structure. A pulley 5 is mounted at one end portion of the arcuate plate 3 for free rotation about a pin 6. The sector plate 1 is mounted on a fixed shaft 10 for free rotation thereabout. A disc 2a of much the same diameter as the disc 2 is fixedly mounted at its center on the shaft 10 and is axially spaced a distance apart from the disc 2. The disc 2a has a flanged edge 2a' and a plurality of circumferentially arranged, radially outwardly projecting pieces 2b. The edge 2a' and the pieces 2b define a passage or groove 2c along a substantial portion of the periphery of the disc 2a, as shown in FIG. 2.

A length of hose 7 has its rear end fixed to a support member 8 disposed adjacent the disc 2 and passes through the passage 2c around the disc 2a, thence around the pulley 5 and the outer periphery of the arcuate plate 3, and finally is drawn outside. The passage 2c helps retain the hose around the periphery of the disc 2a. For the same purpose, a groove 9 is formed in the outer periphery of the arcuate plate 3. It is to be understood that the hose 7 has its outer end connected to a dental instrument (not shown) and its inner end connected to a suitable source of air, water or the like (not shown).

Figure 1:
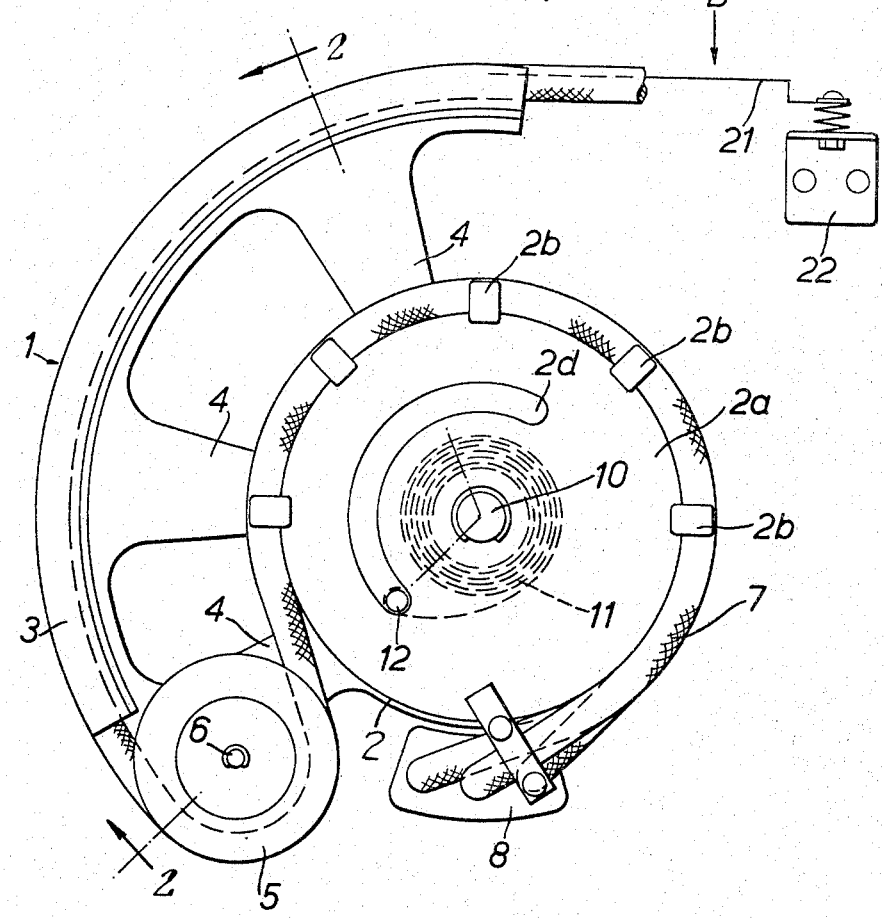
FIG. 1 is a plan view of one embodiment of the invention.
Figure 3:
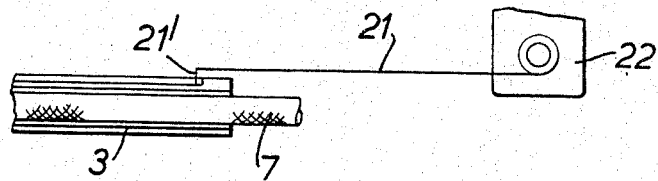
FIG. 3 is a side view of part of FIG. 1 as viewed in the direction of the arrow B.

A spiral spring 11 has its inner end secured to the shaft 10 and its outer end secured to a pin 12 rigidly planted on one side surface of the disc 2. The pin 12 slidably engages in an arcuate slot 2d formed in the disc 2a. The opposite ends of the slot 2d limit the range of movement of the pin 12 and consequently the rotational angle of the sector plate 1. Since the spiral spring 11 is wound clockwise in FIG. 1, it biases the plate 1 counterclockwise.

Referring to FIG. 4, on the reverse side of the arcuate plate 3 there are formed a pair of grooves 13 and 14 which are concentric about the center of the shaft 10 and meet at their common terminal end 15. A plurality of grooves 16 and 17 of two different shapes connect the two concentric grooves 13 and 14. In view of their respective functions, the two kinds of grooves 16 and 17 may be referred to as locking grooves and shunting grooves, respectively. Each of the locking grooves 16 is so bent intermediate its length sideways with respect to the radial direction of the sector 1 so as to be formed into an inverted V-shaped as viewed in FIG. 1, while each of the shunting grooves 17 extends straight but aslant with respect to the radial direction, with the end meeting the groove 14 being displaced toward the terminal end 15. The bent point of each groove 16, which will be referred to as the apex of the groove, is preferably displaced from the center between the two concentric grooves 13 and 14 a little toward the outer groove 13, for the purpose to be described later. The two kinds of grooves are preferably arranged alternately along the length of the grooves 13 and 14.

As shown in FIG. 5, one half 18 of each groove 16 on the side of the groove 13 is of the same depth as the groove 13, while the other half 19 has its bottom surface gradually rising toward the inner groove 14 to the level of the surface of the arcuate plate 3. The bottom surface of each groove 17 is at the same depth as the inner groove 14 where both grooves meet, but gradually rises toward the outer groove 13 to the same level as the surface of the plate 3 where both grooves meet, as shown in FIG. 6. The end portion 17' of the groove 14 also has its bottom surface gradually raised toward the terminal end 15 to the same level as the surface of the plate 3.

A resilient wire 21 has its one end secured to a fixed bracket 22 disposed a predetermined distance from the sector plate 1 and has its opposite free end so bent as to form a hook 21'. The resilient wire extends in parallel with a line tangential to the groove 13 or 14 so that the hooked end 21' would naturally be positioned at a midpoint between the grooves 13 and 14, or at a point therebetween a little radially inward of the apex of the groove 16. Actually, however, the hook is in engagement with the groove 13, 14, 16, 17, or 17', being more or less biased to have a potentiality to restore itself to its natural position due to its resiliency.

In operation, suppose that the hook 21' of the resilient wire 21 is in the terminal end 15 of the concentric grooves with the hose being completely drawn in. Under this condition, if the hose is pulled out from outside by the syringe, the sector plate 1 is rotated clockwise in FIG. 1 against the force of the spring 11 to pay out a certain length of the hose, during which event the hook of the wire travels through the groove 13 counterclockwise, passing one or more of the grooves 16. Then, when the pull on the hose is relieved, the spring 11 rotates the sector plate 1 counterclockwise until the hook 21' arrives at the entrance of the nearest one of the grooves 16 it previously passed, whereupon due to the tendency of the resilient wire 21 to restore the hooked end 21' to the midpoint between the two grooves 13 and 14, the hooked end 21' enters into the groove 16 to engage the apex thereof, thereby locking the sector 1 against further counterclockwise rotation. Consequently the length of the hose that has been paid out has been effectively locked against retraction.

To release the lock, the hose is first pulled out a little, whereupon the hooked end 21' of the wire 21 is disengaged from the apex of the locking groove 16 and passes through the inner half 19 of the groove to enter the inner groove 14. It should be recalled that the apex of the groove 16 is displaced from the center between the grooves 13 and 14 a little toward the outer groove 13, and that the wire 21 has a natural tendency to position its hooked end 21' at a center between the two grooves, that is, at a point a little displaced from the apex of the groove toward the inner groove 14. This assures that when the hooked end 21' has been disengaged from the apex of the groove, it always passes through the inner half 19 of the groove 16 and never gets back into the outer half 18 thereof. Thus, when the hooked end of the wire 21 comes into the groove 14, the pull on the hose may be relieved to permit the sector plate 1 to be rotated counterclockwise by the force of the spring 11, thereby retracting the hose. On the countrary, if it is desired to further draw out the hose, it may simply be further pulled out. This causes the hooked end of the wire 21 to travel counterclockwise along the groove 14 until it is shunted into the next one of the grooves 17, thence into the outer groove 13 and, upon further pulling out the hose, into the groove 16, whereupon the pull on the hose may be relieved to engage the hook 21' with the apex of the groove 16 thereby to securely lock the hose against retraction.

So long as the hook 21' is in the outer groove 13, it never enters therefrom into the shunting grooves 17 or end portion 17' of the groove 14 because the latter have their respective bottom surfaces raised above the bottom surface of the groove 13 where both grooves meet. On the other hand, the hook 21' in the inner groove 14 never enters therefrom into the locking grooves 16 because the latter have their respective bottom surfaces raised above the bottom surface of the groove 14 where both grooves meet.

When the hose has been drawn out the longest possible, the hooked end 21' of the wire 21 is in engagement of the apex of the last locking groove 16', while when it is completely drawn in, the hook 21' is positioned at the terminal end 15 of the grooves 13 and 14, ready to travel into the groove 13 upon next pulling out of the hose.

For a plurality of hoses to be provided, as many units of the above construction may be arranged axially on the shaft 10, as shown in FIG. 2. Such superimposed arrangement causes no substantial increase in the size of the whole assembly.

Having illustrated and described one preferred embodiment of the invention, it is understood that the invention is never limited thereto, but that there are many modifications and changes within the scope of the invention as defined in the appended claims.

What I claim is:

1. Apparatus for drawing in and out a hose for use with a dental instrument, comprising: means mounted for rotation about an axis, said hose having one portion thereof extending in contact with said rotatable means; means associated with said rotatable means and immovable relative thereto for supporting another portion of said hose in contact therewith; means for biasing said rotatable means to rotate in one direction about said axis so as to move said hose in the same direction in sliding contact with said rotatable means, thereby drawing in said hose, said rotatable means being rotated in the opposite direction against said biasing means upon pulling out of said hose, thereby permitting said pulling and consequently paying out of said hose; means for limiting the angle of rotation of said rotatable means; a pair of arcuately extending grooves formed in said rotatable means in concentric relation to each other about said axis and meeting at a common terminal end; a plurality of locking grooves connecting said concentric pair of grooves, each of said locking grooves being of a V-shaped configuration with its apex positioned toward said common terminal end of said concentric grooves, and comprising a first and a second extension at opposite sides of said apex, said first extension communicating with one of said arcuate grooves and having a bottom surface of substantially the same depth as that of said one arcuate groove, and said second extension communicating with the other of said arcuate grooves and having a bottom surface gradually raised from the bottom surface of said first extension towards said other arcuate groove above the bottom surface thereof; a plurality of shunting grooves connecting said arcuate grooves, each of said shunting grooves extending straight but aslant from said one to the other arcuate groove toward said common terminal end, and having a bottom surface gradually raised from the bottom surface of said other arcuate groove towards said one arcuate groove above the bottom surface thereof; a resilient member of a predetermined length having one end fixed apart from said rotatable means and its opposite free end provided with a hook engaging in one of said arcuate grooves and engageable in said locking grooves and shunting grooves, said resilient member always tending to position said hook between said apex of said locking grooves and said other arcuate groove.

2. The apparatus as defined in claim 1, wherein said rotatable means comprises: a generally sector-shaped plate consisting of a central disc mounted on a fixed shaft for rotation thereabout, a peripheral arcuate plate and a plurality of radial ribs connecting said disc and arcuate plate into an integral structure; and a pulley mounted on said arcuate plate for rotation about an axis;

said concentric grooves, locking grooves and shunting grooves being formed on one side surface of said arcuate plate, and said one portion of the hose extending both along the periphery of said arcuate plate and around said pulley in contact therewith.

3. The apparatus as defined in claim 2, wherein said immovable hose-supporting means comprises an immovable disc having substantially the same diameter as that of said movable central disc and mounted fixedly on said shaft axially spaced apart from said central disc; said other portion of the hose extending around a portion of the periphery of said immovable disc in contact therewith.

4. The apparatus as defined in claim 1, wherein said locking grooves and shunting grooves are alternately arranged along the length of said arcuate grooves.

5. The apparatus as defined in claim 3, wherein said biasing means comprises a spiral spring disposed between said movable central disc and said immovable disc and having opposite ends fixed to said fixed shaft and said movable central disc, respectively.

6. The apparatus as defined in claim 3, wherein said rotational angle limiting means comprises a pin rigidly planted on said movable central disc and an arcuate slot formed in said immovable disc for said pin to engage in.

7. An apparatus for selectively drawing in and out a plurality of hoses each having its outer end connected to a dental instrument, comprising for each of said hoses: means mounted for rotation about an axis; each hose having one portion thereof extending in contact with said rotatable means; means associated with said rotatable means and immovable relative thereto for supporting another portion of each hose in contact therewith; means for biasing said rotatable means to rotate in one direction about said axis so as to move said hose in the same direction in sliding contact with said rotatable means, thereby drawing in each hose, said rotatable means being rotated in the opposite direction against said biasing means upon pulling out of each hose, thereby permitting said pulling and consequently paying out of each hose; means for limiting the angle of said rotatable means; a pair of arcuately extending grooves formed in said rotatable means in concentric relation to each other about said axis and meeting at a common terminal end; a plurality of locking grooves connecting said concentric pair of grooves, each of said locking grooves being of a V-shaped configuration with its apex positioned toward said common terminal end of said concentric grooves, and comprising a first and a second extension at opposite sides of said apex, said first extension communicating with one of said arcuate grooves and having a bottom surface of substantially the same depth as that of said one arcuate groove, and said second extension communicating with the other of said arcuate grooves and having a bottom surface gradually raised from the bottom surface of said first extension towards said other arcuate groove above the bottom surface thereto; a plurality of shunting grooves connecting said arcuate grooves, each of said shunting grooves extending straight but aslant from said one to other arcuate groove toward said common terminal end, and having a bottom surface gradually raised from the bottom surface of said other arcuate groove toward said one arcuate groove above the bottom surface thereof; a resilient member of a predetermined length having one end fixed apart from said rotatable means and its opposite free end provided with a hook engaging in one of said arcuate grooves and engageable in said locking grooves and shunting grooves, said resilient member always tending to position said hook between said apex of said locking grooves and said other arcuate groove.

References Cited

UNITED STATES PATENTS 1,864,891   6/1932   Coberly et al. _____ 242—47.5
2,351,943   6/1944   Ebbers et al. _____ 242—47.5 X FRANK J. COHEN, *Primary Examiner.*

N. L. MINTZ, *Assistant Examiner.*